United States Patent Office 3,073,801
Patented Jan. 15, 1963

3,073,801
PROCESS FOR PREPARING POLYETHYLENE TEREPHTHALATE
Erhard Siggel, Laudenbach (Main), and Lothar Riehl, Obernburg (Main), Germany, assignors to Vereinigte Glanzstoff-Fabriken A.G., Wuppertal-Elberfeld, Germany
No Drawing. Filed Apr. 29, 1959, Ser. No. 809,620
Claims priority, application Germany June 13, 1958
7 Claims. (Cl. 260—75)

The present invention relates to an improved process for the production of polyethylene terephthalate.

It is known that polyethylene terephthalate is prepared by a two-stage process. Initially, dimethyl terephthalate or terephthalic acid is condensed with ethylene glycol to form the diglycol ester of terephthalic acid by means of an ester interchange. A certain amount of a low molecular weight precondensate is also formed at this time. Thereupon, the temperature of the reaction is raised and a vacuum is applied to the system to produce a polycondensate by splitting off methanol or water. Both the ester interchange reaction and the polycondensation require the use of particular catalysts if the processes are to be completed within a reasonable period of time. The catalysts most frequently used for the ester interchange are magnesium acetate, zinc acetate, and manganese acetate. The catalysts that are commonly employed for the polycondensation stage of the reaction are antimony trioxide, lead oxide, and boron trioxide.

There are several problems involved in the production of polyethylene terephthalate that are created because of the need for separate ester interchange and polycondensation catalysts. Because it is desirable to avoid interrupting the course of the reaction after the ester interchange, the polycondensation catalysts are often added to the dimethyl terephthalate and ethylene glycol charge. Adding the polycondensation catalysts at this point, however, creates several difficulties. First of all, during the ester interchange certain compounds such as methanol, glycol, and acetaldehyde are present which considerably reduce the effectiveness of or inactivate the polycondensation catalyst. Secondly, the fact that the polycondensation catalysts are exposed to high reaction temperatures (160–240° C.) for five hours or more also impairs their efficiency. Thirdly, during this five hour or more period, the catalysts are reduced freeing their metal which decrease the quality of the end products, for example, by causing the polycondensate to take on a greyish color.

In order to avoid the disadvantages described above, processes have been developed in which the polycondensation catalyst is added after the ester interchange. Because the two reactions are not entirely separate, however, the reaction vessel contains both a mixture of diglycol terephthalate and low molecular weight polyethylene terephthalate which have different viscosities. Therefore, powdered catalysts such as Sb$_2$O$_3$ would not be adequately distributed in the precondensate because of its greater viscosity. This is especially true where the process is carried out under plant scale conditions. If the catalyst is added in the form of tablets after the ester interchange, the tablets tend to sink to the bottom of the precondensate and cannot be uniformly distributed throughout the reaction mixture even with vigorous stirring.

In view of the deficiencies in the prior art processes, it is an object of the present invention to provide a process for preparing high molecular weight polyethylene terephthalate which is not subject to the difficulties discussed above.

Another object of the invention is to provide a process for preparing polyethylene terephthalate which can be completed in as short a time as about four hours.

A further object of the invention is to provide a method of preparing polyethylene terephthalate wherein the color of the finished product is greatly improved over that obtained following prior art processes.

Still another object of the invetnion is to provide improved catalysts for the preparation of polyethylene terephthalate.

In general, the present invention involves the discovery that known methods of preparing polyethylene terephthalate polymers can be improved if the polycondensation catalyst is an ortho-antimonate of the metals of group II of the periodic table. These compounds have the general formula MeII$_3$(SbO$_4$)$_2$ wherein MeII$_3$ stands for metals of group II of the periodic table. The three cations of the molecule may consist of ions of the same metal or ions of different metals of the subject group as, for example, MgZn$_2$(SbO$_4$)$_2$. These orthoantimonates are insoluble in the reaction mixture.

The above catalysts are neither inactivated by exposure to high reaction temperatures for long periods nor are they reduced by aldehydes or the like. For this reason they can safely be added at the beginning of the ester interchange reaction. Preferably, however, the addition of the polycondensation catalysts should take place after the ester interchange has been completed and when the reactants have attained a viscosity of from about $\eta_{rel}=1.08$ to about 1.2. This corresponds to a K value of about 17 to 25 (determined as a 1% solution in m-cresol at 25° C.).

The amount of polycondensation catalyst added either to the dimethyl terephthalate-ethylene glycol charge or to the precondensate should be from about 0.01 to about 0.1% by weight based on the weight of the dimethyl terephthalate used in the reaction.

In the examples set forth below, the color of the products in terms of remission measurements was determined by the use of an electric remission photometer having a filter of 460 m$\mu$. The percentages given in the data indicate the amount of light reflected from the product and are based upon a scale in which the reflection of pure MgO is considered as 100%. The measurements were carried out on polymers having a particle size of 0.60 to 0.84 mm. diameter.

Example 1

Four hundred (400) g. DMT (dimethyl terephthalate), 275 ml. of ethylene glycol, and 60 mg. (0.015%) of zinc acetate were melted in a suitable condensation flask with stirring under a nitrogen blanket. The temperature of the reactants was then rapidly raised to insure that no ester was distilled over with the split-off methanol and ethylene glycol. After reaching a temperature of 240° C. (3½ hours) 80 mg. magnesium-O-antimonate (0.02%) dispersed in as small amount of ethylene glycol as possible and 200 mg. titanium dioxide (0.5%) in the form of a 20% glycol dispersion was added to the reactants. The condensation flask was then carefully brought down to 0.1 mm. Hg vacuum over a 45 minute period. By this time the reaction temperature had reached 270° C. The temperature was allowed to gradually rise to 276° C. and the vacuum was maintained until the polymer had reached a viscosity of $\eta_{rel}=1.630$ to 1.650.

Data:

Total condensation time: 4 to 4½ hours
Solution viscosity: $\eta_{rel}=1.630$ to 1.650
Softening point: 260 to 261° C.
Remission degree with a filter m$\mu$: 78 to 81%

Example 2

The process described in Example 1 was carried out again except that 80 mg. antimony trioxide (0.02%) was used as a polycondensation catalyst rather than magnesium-O-antimonate.

Data:
Total condensation time, figured from beginning of evacuations: 5½ hours
Solution viscosity: $\eta_{rel}=1.630$ to $1.640$
Softening point: 260 to 261° C.
Remission degree at 460 m$\mu$: 70 to 72%

Example 3

The process described in Example 1 was carried out once more except that the polycondensation catalyst (magnesium-O-antimonate) was added with the zinc acetate catalyst prior to the ester interchange reaction. When the polymer had reached a proper viscosity, it was cooled and then analyzed.

Data:
Total condensation time: 4 to 4½ hours
Solution viscosity: $\eta_{rel}=1.630$ to $1.650$
Softening point: 260 to 261° C.
Remission degree: 78 to 81%

Example 4

Once again the process described in Example 1 was carried out except that in this case $MgZn_2(SbO_4)_2$ was used as the polycondensation catalyst. The results obtained corresponded to the data given under Example 1.

Example 5

The process described in Example 3 was repeated six times using the following polycondensation catalysts:

(1) Cadmium-O-antimonate
(2) Calcium-O-antimonate
(3) Zinc-O-antimonate
(4) Beryllium-O-antimonate
(5) Barium-O-antimonate
(6) Strontium-O-antimonate In each case the results obtained substantially duplicated those shown in the data under Example 3.

The present invention improves prior art methods of preparing polyethylene terephthalate in several significant respects. Formerly, the fact that antimony trioxide and other polycondensation catalysts were reduced during the reaction and the fact that nonvolatile aldehyde resins were produced caused the product to be discolored. Following the present teaching, however, little, if any, product discoloration takes place. Additionally, the subject polycondensation catalysts are neither inactivated by exposure to high temperatures nor are they reduced by aldehydes or the like. They can expeditiously be added either at the beginning of the ester interchange reaction or after completion of the ester interchange. As was pointed out above, however, the catalysts preferably are added when the reactants attain a viscosity of from about $\eta_{rel}=1.08$ to about 1.2. Another significant advantage obtained following the present process is that the viscosity required for the finished polymer (about $\eta_{rel}=1.63$) can be reached in approximately 4 to 4½ hours rather than about 5½ hours which is required following prior art procedures.

The amount of catalyst used in the present invention corresponds approximately to the amount used in prior art methods. Ordinarily, from about 0.01 to about 0.1% by weight of catalyst based on the amount of dimethyl terephthalate used in the charge is found to be satisfactory.

As was pointed out above, the catalysts are the ortho-antimonates of metals found in group II of the periodic table. These metals include beryllium, magnesium, calcium, zinc, strontium, cadmium and barium. The ortho-antimonate compounds have the general formula $$MeII_3(SbO_4)_2$$

The three cations of the molecule may consist of ions of the same metal or a mixture of the subject metals.

Obviously many modifications and variations of the invention as hereinbefore set forth may be made without departing from the spirit and scope thereof, and therefore only such limitations should be imposed as are indicated in the appended claims.

The invention is hereby claimed as follows:

1. In a method of preparing polyethylene terephthalate wherein dimethyl terephthalate is reacted with ethylene glycol in the presence of an ester interchange catalyst to form the diglycol ester of terephthalic acid and whereto in the diglycol ester of terephthalic acid subsequently is polymerized in the presence of a polycondensation catalyst, the improvement which comprises: incorporating in the reaction mixture as the polycondensation catalyst for the polymerization of the diglycol ester of terephthalic acid from about 0.01 to about 0.1% by weight based on the weight of said dimethyl terephthalate of an insoluble ortho-antimonate having the formula $XYZ(SbO_4)_2$ wherein X, Y, and Z are metals selected from the group consisting of beryllium, magnesium, calcium, zinc, strontium, cadmium, and barium; and thereafter maintaining the reaction mixture at a suitable temperature to effect the polymerization of said diglycol ester of terephthalic acid.

2. In a method of preparing polyethylene terephthalate wherein dimethyl terephthalate is reacted with ethylene glycol in the presence of an ester interchange catalyst to form the diglycol ester of terephthalic acid and wherein the diglycol ester of terephthalic acid subsequently is polymerized in the presence of a polycondensation catalyst, the improvement which comprises: adding to the reaction mixture as the polycondensation catalyst from about 0.01 to about 0.1% by weight based on the weight of said dimethyl terephthalate an insoluble ortho-antimonate having the formula $XYZ(SbO_4)_2$ wherein X, Y, and Z are metals selected from the group consisting of beryllium, magnesium, calcium, zinc, strontium, cadmium, and barium, said addition taking place when the reaction mixture reaches a viscosity of from about $\eta_{rel}=1.08$ to about $\eta_{rel}=1.2$; and thereafter maintaining the reaction mixture at a suitable temperature to effect the polymerization of said diglycol ester of terephthalic acid.

3. A method as in claim 2 wherein the insoluble ortho-antimonate is magnesium-O-antimonate.

4. A method as in claim 2 wherein the insoluble ortho-antimonate is cadmium-O-antimonate.

5. A method as in claim 2 wherein the insoluble ortho-antimonate is calcium-O-antimonate.

6. A method as in claim 2 wherein the insoluble ortho-antimonate is zinc-O-antimonate.

7. A method as in claim 2 wherein the insoluble ortho-antimonate is beryllium-O-antimonate.

References Cited in the file of this patent

UNITED STATES PATENTS

| 2,465,319 | Whinfield | Mar. 22, 1949 |
| 2,739,957 | Billica | Mar. 27, 1957 |

FOREIGN PATENTS

| 795,968 | Great Britain | June 4, 1958 |
| 1,023,885 | Germany | Feb. 6, 1958 |

UNITED STATES PATENT OFFICE
CERTIFICATE OF CORRECTION

Patent No. 3,073,801                              January 15, 1963

Erhard Siggel et al.

It is hereby certified that error appears in the above numbered patent requiring correction and that the said Letters Patent should read as corrected below.

Column 2, line 72, for "filter m$\mu$" read -- filter of 460 m$\mu$ --; column 4, line 66, for "Mar. 27, 1957" read -- Mar. 27, 1956 --.

Signed and sealed this 8th day of October 1963.

(SEAL)
Attest:

ERNEST W. SWIDER
Attesting Officer

EDWIN L. REYNOL

Acting Commissioner of Patent